(12) United States Patent
Iwata

(10) Patent No.: US 7,770,839 B2
(45) Date of Patent: Aug. 10, 2010

(54) FLIGHT MACHINERY

(75) Inventor: Kakuya Iwata, Tsukuba (JP)

(73) Assignee: National Institute of Advanced Industrial Science and Technology (JP)

( * ) Notice: Subject to any disclaimer, the term of this patent is extended or adjusted under 35 U.S.C. 154(b) by 263 days.

(21) Appl. No.: 11/958,521

(22) Filed: Dec. 18, 2007

(65) Prior Publication Data

US 2009/0152393 A1  Jun. 18, 2009

(51) Int. Cl.
*B64C 1/26* (2006.01)
(52) U.S. Cl. ............................................. 244/38
(58) Field of Classification Search ............... 244/38, 244/200, 201
See application file for complete search history.

(56) References Cited

U.S. PATENT DOCUMENTS

| | | | | |
|---|---|---|---|---|
| 1,040,533 A | * | 10/1912 | Esnault | 244/38 |
| 1,185,536 A | * | 5/1916 | Rabick | 244/38 |
| 1,945,254 A | * | 1/1934 | Bittner | 244/38 |
| 2,066,649 A | * | 1/1937 | Sabins | 244/38 |
| 2,073,350 A | * | 3/1937 | Oshorn | 244/38 |
| 2,186,558 A | * | 1/1940 | Rouanet et al. | 244/38 |
| 2,288,829 A | * | 7/1942 | Newman | 244/13 |
| 2,461,747 A | * | 2/1949 | Leonard et al. | 244/38 |
| 4,158,448 A | * | 6/1979 | Mochizuki | 244/13 |
| 4,272,912 A | * | 6/1981 | Lapierre | 446/34 |
| 5,915,650 A | * | 6/1999 | Petrovich | 244/46 |

* cited by examiner

*Primary Examiner*—Christopher P Ellis
(74) *Attorney, Agent, or Firm*—Husch Blackwell Sanders LLP

(57) ABSTRACT

The flight machinery includes a structure in which a main body and a lightweight wing having an unvalued weight compared with the main body are connected by use of a power joint on a line joining the center of a lift force and the center of gravity of the wing in the manner that the main body is positioned under the wing. Accordingly, it is possible to exhibit a function of the flight machinery by adjusting the power joint connecting the upper part and the lower part or the wing to the main body even if the wing and the main body have different characteristics. Additionally, it is possible to stabilize a posture by positioning the total center of gravity at the main body at the lower part. At the same time, it is possible to stabilize the posture just by controlling the position of the servomotor of the power joint.

7 Claims, 7 Drawing Sheets

(Fig. 1A Prior Art)   (Fig. 1B Prior Art)
KNOWN EMBODIMENT 1 (LOW-WING AIRCRAFT)
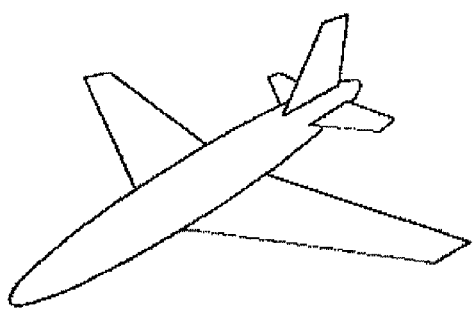
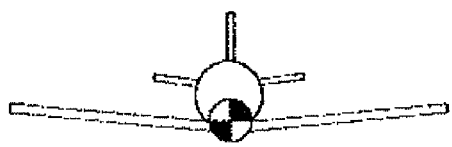
(Fig. 2A Prior Art)   (Fig. 2B Prior Art)
KNOWN EMBODIMENT 2 (HIGH-WING AIRCRAFT)
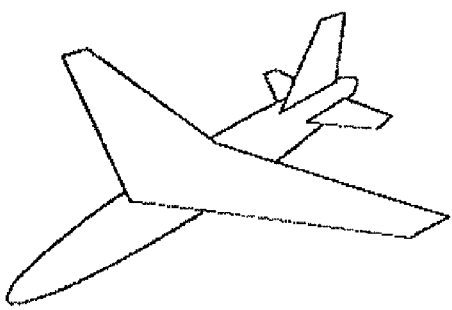
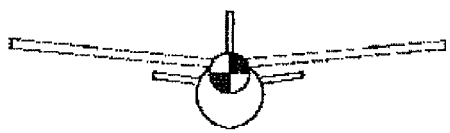

(Fig. 3A Prior Art) (Fig. 3B Prior Art)
KNOWN EMBODIMENT 3 (SUPER HIGH-WING AIRCRAFT)
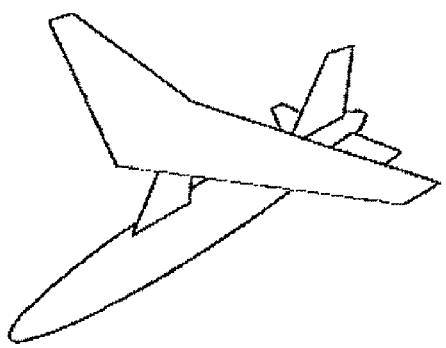 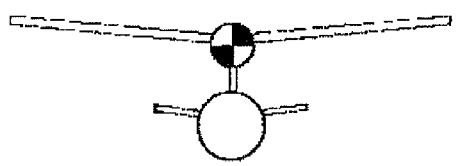
(Fig. 4A Prior Art) (Fig. 4B Prior Art)
KNOWN EMBODIMENT 4 (SUPER HIGH-WING AIRCRAFT)
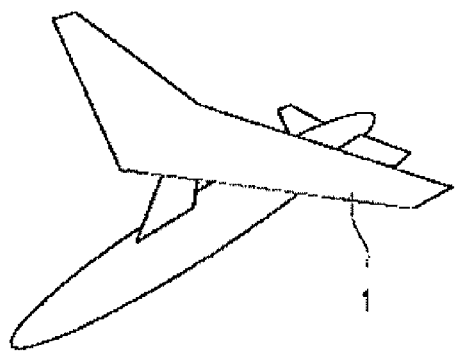 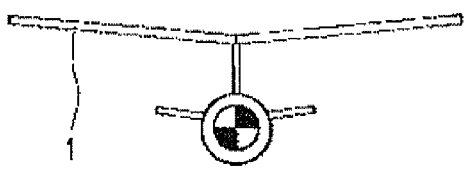

(Fig. 5A)  (Fig. 5B)
BASIC EMBODIMENT ACCORDING TO THE INVENTION (HOWEVER, APPLICATION OF SUSPENSION STRUCTURE IS DIFFICULT)
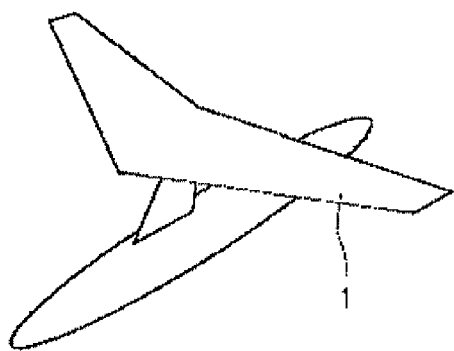
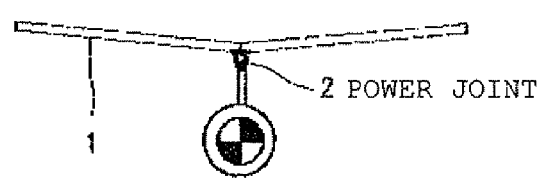
2 POWER JOINT
(Fig. 6)
EXEMPLARY SUSPENSION IN AUTOMOBILE
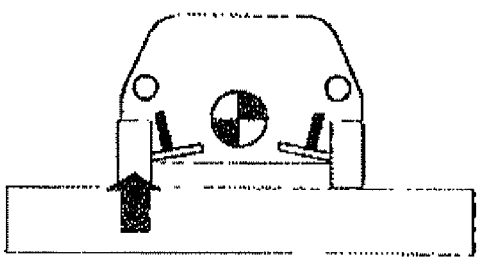
VERTICAL TRANSLATION AXIS
ROLL AXIS
PITCH AXIS

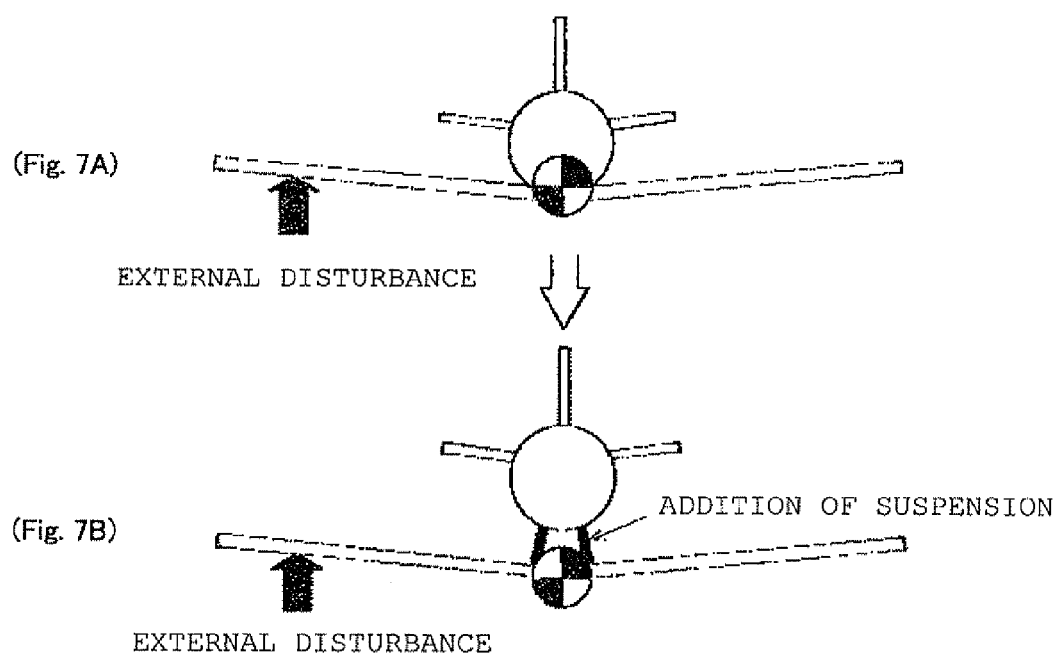
(Fig. 7A)
(Fig. 7B)
PROBLEM: ABSORPTION AND ALLEVIATION OF POSTURE CONTROL OPERATION USING TAIL WING OPERATION PRINCIPLE ACCORDING TO THE INVENTION
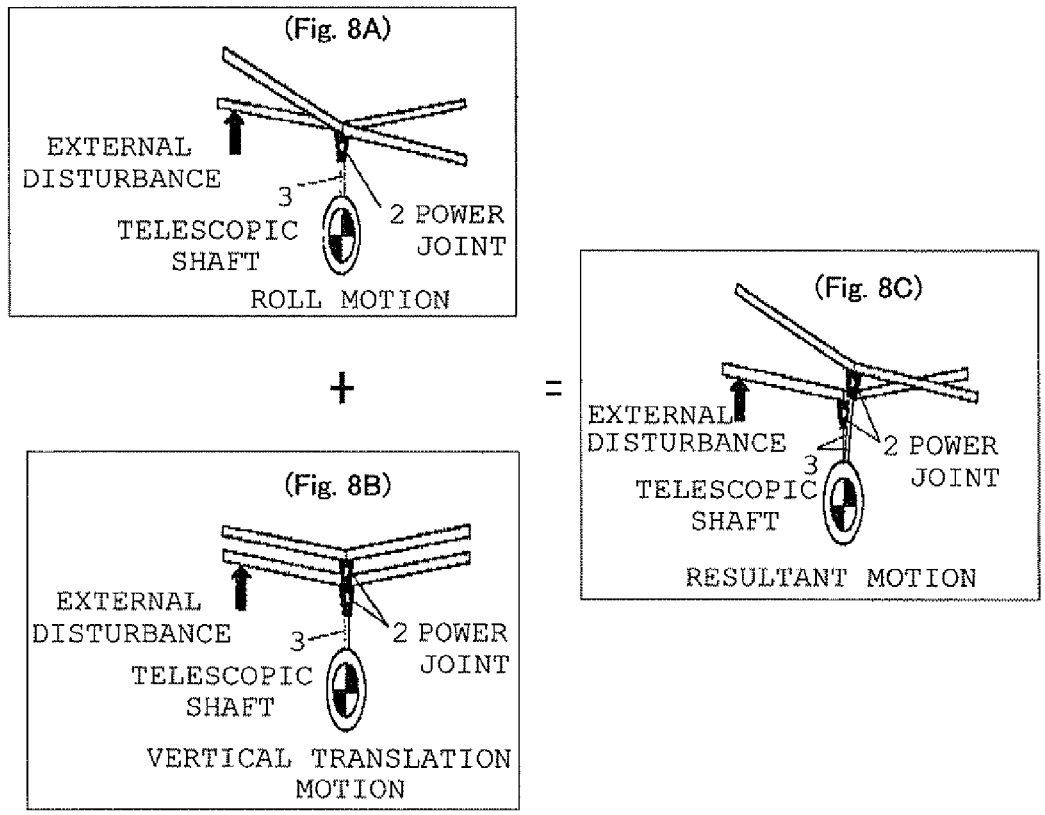
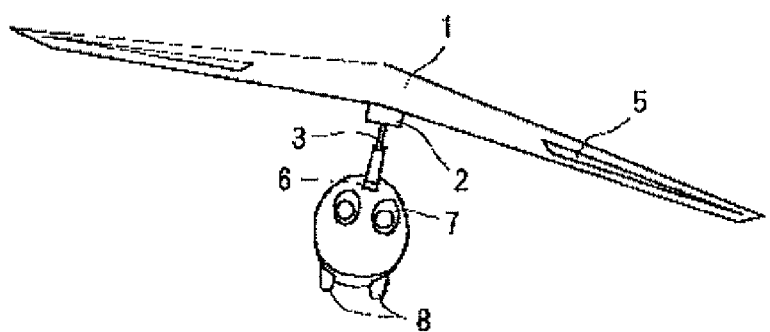
(Fig. 9)

(Fig. 10)
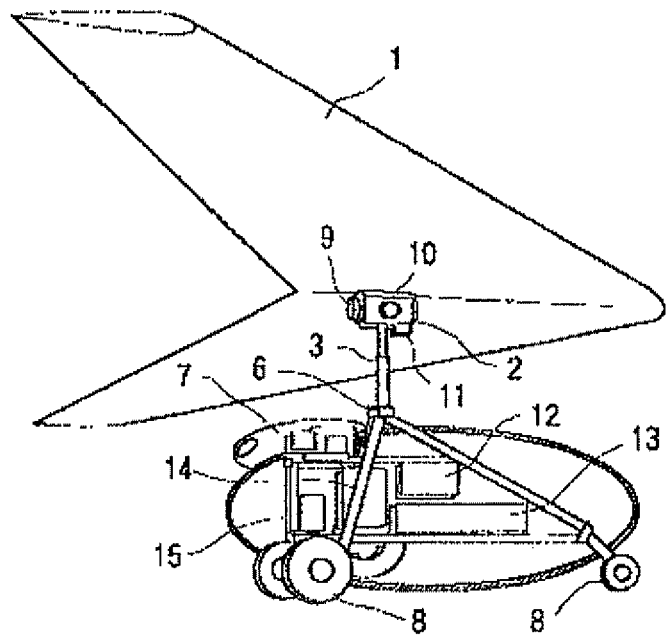
FOLDING OPERATION OF MAIN WING
(Fig. 11A)
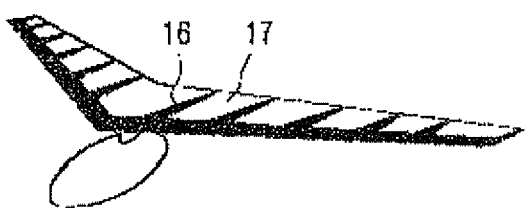
(Fig. 11B)
(Fig. 11C)

(Fig. 12)
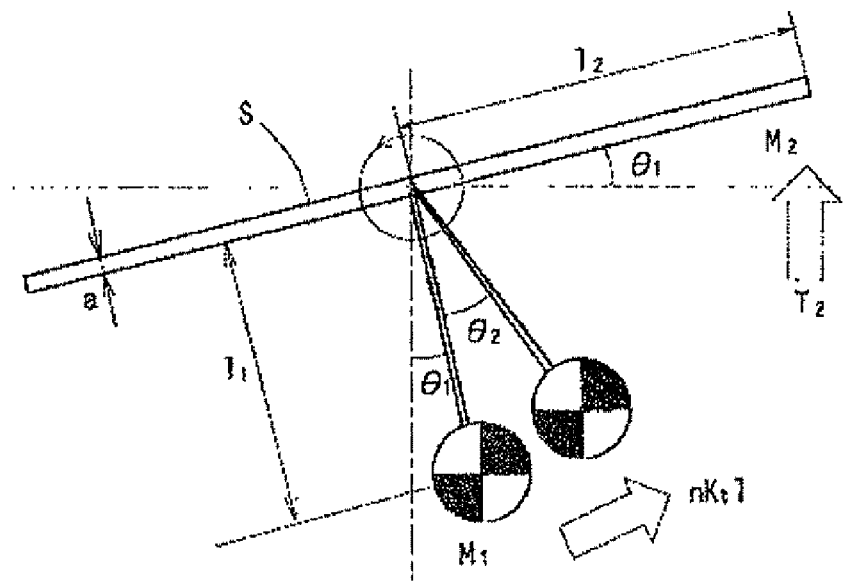
(Fig. 13)
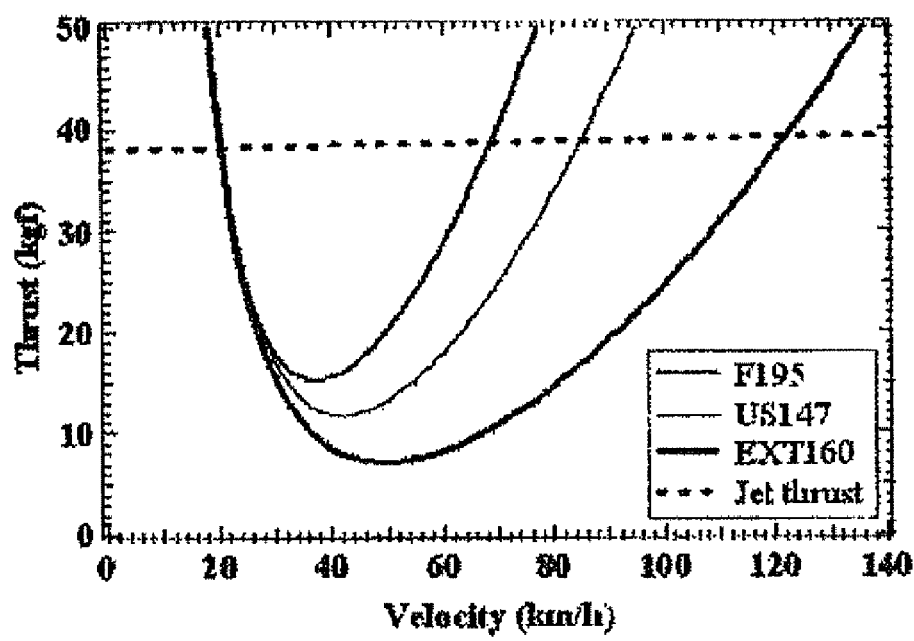

FLIGHT MACHINERY

FIELD OF THE INVENTION

The present invention relates to a structure, a design method, and a standardization method of a flight machinery which includes a wing and a fuselage as a main body and which flies with safety and high posture stability in the air. Also, the invention relates to a physical distribution system and a transportation facility using the flight machinery.

BACKGROUND OF THE INVENTION

The transition from a public to a personal transportation facility has been, in a form of widespread use of private automobile, a change factor of a housing environment structure and a society structure as observed in development of suburban retail sales after the beginning of the $21^{st}$ century even in Japan with a small land area. However, the transition from the public to the personal transportation facility has been realized only in a land transportation facility. This is because of a technical problem, and if a sufficient technique is prepared, an air transportation facility which currently belongs to the public transportation facility will change for sure to the personal transportation facility sooner or later. The applicant has filed a Japanese Patent Application No. 2003-374911 as a solution technique for the technical problem.

In addition to the above-mentioned prior art, the Japanese Patent Application Laid-Open No. H07-040897 and the Japanese Patent Application Laid-Open No. H09-109999 disclose an aircraft having a lightweight wing. However, since a main wing is fixed to a fuselage and cannot be controlled by a power joint, there exists a tail wing in the aircraft. Additionally, there is a Non-Patent Document as described below.

In a land transportation facility, a railroad as a public transportation facility and an automobile as a personal transportation facility are technically quite different from each other today. Likewise, in an air transportation facility, an aircraft as a current public transportation facility and an aerial transportation facility disclosed in the Japanese Patent Application No. 2003-374911 as a next-generation personal transportation facility are technically very different from each other.

As disclosed in the above-mentioned Japanese Patent Application No. 2003-374911, the most characteristic feature of the technique is that a takeoff/landing is not carried out at an airport or a runway occupying a vast land, but in an aerial space. However, in order to carry out the aerial takeoff/landing, it is necessary for a flight machinery as an aerial transportation facility to have a new function.

In case of a fixed-wing aircraft, problems in applying the known aircraft to an aerial takeoff/landing system arise, e.g., in a high stall velocity, unnecessary structures such as a tail wing for stabilization, and a design development on per-configuration basis that requires a large amount of development cost. Also, in case of a bladed aircraft, problems arise, e.g., in a risk that a rotating main rotor contacts facilities for an aerial takeoff/landing, rotor noise, unnecessary structures such as a tail rotor, and a design development on per-configuration basis that requires a large amount of development cost.

These problems prevent aircrafts from being applied as a developed transportation facility that can perform an aerial takeoff/landing. In particular, the problem of a design development on per-configuration basis that requires a large amount of development cost has been a major problem for the development of the field, since it involves enormous cost and time to build up a development know-how, which leads to a monopoly of the field by companies having the development know-how.

DISCLOSURE OF THE INVENTION

Accordingly, in order to solve the problem, the present invention provides a flight machinery in which a wing and a main body separately designed and manufactured are connected to each other in a certain manner to exhibit their functions.

In the known aircraft, since the wing and the main body are integrally formed with each other, it is extremely important to determine a position of the center of gravity In addiction, the connection boundary is also an important hydrodynamic. Thus, it is taken for granted that the wing and the main body are integrally designed and manufactured at the same time.

An object of the invention is to make it possible to separately design and manufacture the wing and the main body. This enables using the already developed wings or the wings which have been developed by other companies.

Additionally, since the known aircrafts as a public transportation facility are large in size, they fly at high altitude in the sky where atmospheric density is low in order to reduce a cost. As a result, no structure corresponding to a suspension in a land transportation facility has been developed. However, in the case where an aircraft is used as the personal transportation facility as disclosed in Japanese Patent Application No. 2003-374911, it is a big technical issue that the suspension structure needs to be prepared to absorb and alleviate external disturbance and shock, because the aircraft flies at low speed in the area where atmospheric density is high.

The invention provides a flight machinery having a structure in which the wing and the main body are connected to each other by a power joint and a telescopic shaft. This enables absorption and alleviation of external disturbance and shock, and thus there is proposed a system in which the wing and the main body separately designed and manufactured are connected to each other in a certain manner to exhibit their functions. In order to realize the system, a connection method for connecting the wing to a fuselage as the main body on a line joining the wing's center of a lift force to the center of gravity is used. Additionally, there is proposed a structure having a function to automatically control every combination of the wing and the main body by using the power joint and the telescopic shaft for the connection.

More specifically, according to an aspect of the invention, there is provided a flight machinery including a main wing and a fuselage as a main body which are connected to each other by a power joint and a telescopic shaft to configure a suspension at a connection thereof, wherein an external shock during flight is absorbed by the suspension.

According to another aspect of the invention, there is provided a flight machinery including a lightweight wing having 50% or less weight than that of a main body and a fuselage as the main body which are connected to each other by a power joint and a telescopic shaft to configure a suspension at a connection thereof, wherein an external shock during flight is absorbed by the suspension.

According to still another aspect of the invention, there is provided a flight machinery including a lightweight wing having 50% or less weight than that of a main body and a fuselage as the main body which are connected to each other by a power joint and a telescopic shaft on a line joining a center of gravity of the lightweight wing and a center of a lift force of the lightweight wing to configure a suspension at a connection thereof, wherein an external shock during flight is absorbed by the suspension.

According to still another aspect of the invention, there is provided a flight machinery including a lightweight wing having 50% or less weight than that of a main body and a fuselage as the main body which are connected to each other by a power driven three-degree-of-freedom joint and a telescopic shaft on a line joining a center of gravity of the lightweight wing and a center of a lift force to configure a suspension at a connection thereof, wherein an external shock during flight is absorbed by the suspension.

In the above-described flight machinery, the connection portion may be configured such that the main wing and the fuselage are detachably connected at the connection and the main wing is selectively applicable to another fuselage while the fuselage is selectively applicable to another main wing.

In the above-described flight machinery, the connection between the main wing and the fuselage may have a common standard structure for a plurality of main wings and fuselages, and the main wing and the fuselage may be arbitrarily selected to connect to each other.

In the above-described flight machinery, the main wing may be a foldable wing.

In the above-described flight machinery, the fuel tank may not be provided in the wing, but in other structure.

The above-described flight machinery may be used in a physical distribution system or a transportation facility.

According to the invention, a flight machinery equipped with a suspension similar to that of an automobile and operating in the air is realized. Therefore it is possible to provide a flight machinery which flies stably at a low altitude and low speed while ensuring a comfort.

In addition, since the wing and the main body can be designed and manufactured separately, it is possible to design and develop a flight machinery by using a wing which have been subjected to wind tunnel tests and has an evident flight characteristic Thus it is not necessary to spend a large amount of development money on wind tunnel tests or actual flight tests. Additionally, it is possible to make a big cost reduction effect by sharing the manufacture and a big market effect of multiproduct production resulted from the diversification of the combination of the wing and the main body.

Moreover, since the structure such as a fuel tank is not provided in the wing, the wing decreases in weight, and thus it is possible to use the wing having a simple structure and low cost. By using foldable wing, the space efficiency when housed on land is remarkably improved.

Since the wing and the main body are connected to each other and the fuel tank for an engine is provided in the main body, a change of position of the center of gravity in accordance with a fuel reduction does not affect the wing. Alternatively, the wing can be automatically controlled by adjusting the power joint.

By steering the aircraft by controlling the wing with the power joint, mechanisms such as ailerons and flaps of the wing can be omitted, thereby providing a lightweight foldable wing.

An engine for generating a thrust force can be mounted to an arbitrary position, but particularly when mounted to the main body, it is possible to remarkably improve a design freedom, because a slight change of the position of center of gravity or the thrust line can be adjusted by operating the power joint.

BRIEF DESCRIPTION OF THE DRAWINGS

FIGS. 1A and B are explanatory views illustrating a structure of a known low-wing aircraft.

FIGS. 2A and 2B are explanatory views illustrating a structure of a known high-wing aircraft.

FIGS. 3A and 3B are explanatory views illustrating a concept of a joint connection of a super high wing. This structure is a kind of a pendulum structure that creates posture stability in the air by gravity of main body fuselage plummet.

FIGS. 4A and 4B are explanatory views illustrating that a vertical tail wing is not necessary because of the sweepback wing effect of the super high wing.

FIGS. 5A and 5B are explanatory views illustrating that a horizontal tail wing is not necessary because of the powered joint connection control of the pendulum structure.

FIG. 6 is an explanatory view illustrating a function and structure of a suspension on land.

FIGS. 7A and 7B are explanatory views illustrating a concept of the suspension that is applied to a known aircraft structure.

FIGS. 8A, 8B, and 8C are explanatory views illustrating an application of a suspension to an embodiment of the present invention.

FIG. 9 is a schematic view illustrating a prototypic flight machinery.

FIG. 10 is an explanatory view illustrating an internal structure of the prototypic flight machinery.

FIGS. 11A, 11B, and 11C are explanatory views illustrating a housing and ground operation of a foldable lightweight wings.

FIG. 12 is an explanatory view illustrating a posture control by the pendulum structure with the joint connection of the super high wing.

FIG. 13 is a graph illustrating a required thrust force curve characteristic of the wings of flight machinery according to an embodiment of the present invention.

EXAMPLES FOR CARRYING OUT THE INVENTION

A fuselage of a flight machinery is divided into a wing and a main body, and equipments such as a fuel tank are moved from the wing to the main body so that the wing decreases in weight by loading the majority of the weight on the main body. At the same time, the wing and the main body are connected to each other by means of a three-degree-of-freedom power joint and a telescopic shaft on a line joining the center of gravity and the center of a lift force of the wing. By combining the separately designed wing and the main body, it is possible to rapidly produce a flight machinery having a structure to configure a suspension operating in the air at a low cost.

A known exemplary aircraft is shown in FIGS. 1A and 1B. FIGS. 1A and 1B are schematic views illustrating a most common low-wing aircraft in which a center of gravity is generally located in the vicinity of a large wing having a fuel tank so as to realize a low center of gravity and stable structure. FIGS. 2A and 2B are schematic views illustrating a high-wing aircraft in which the position of center of gravity is high as the location of the wing is high. FIGS. 3A and 3B illustrate a super high-wing aircraft in which the position of the wing is higher. It is unstable because the center of gravity is high, as in FIG. 2.

For this reason, as shown in FIGS. 4A and 4B, the center of gravity is maintained low by housing a fuel tank in a main body and using a lightweight wing 1. The prior arts have been disclosed as the inventions of aircrafts with a lightweight wing e.g. in Japanese Patent Application Laid-Open No. H07-040897 and Japanese Patent Application Laid-Open No. H09-109999. In FIGS. 4A and 4B, a structure that connects the main body to the wing serves as a vertical tail wing, and thus it is not necessary to provide the vertical tail wing.

In addition, as shown in FIGS. 5A and 5B, when a power joint that moves the lightweight wing is used for connecting the wing to the main body, an elevation angle of the wing is controlled by the power joint 2. Thus it is not necessary to provide the horizontal tail wing. Further, the power joint 2 can be controlled in three axes of directions: a roll direction, a pitch direction, and a yaw direction. Therefore, as described above, it is not necessary to provide the horizontal tail wing for pitch control. Accordingly, aerodynamic devices that are to be provided in the main body are totally omitted, and thus of the design freedom of the main body is remarkably improved. For this reason, the invention basically adopts the embodiment shown in FIGS. 5A and 5B.

Next, it will be described about a mechanism for absorbing and alleviating an external shock and disturbance Taking an automobile as an example in which the mechanism is particularly developed, it is a suspension that mainly serves as the mechanism for absorbing and alleviating an external shock and disturbance. In the case of an automobile moving on a two-dimensional land, the external shock and disturbance largely affect the three degree of freedom of a vertical translation axis, a pitch axis, and a roll axis out of a total of six axes of translation and rotation. The shock and disturbance are absorbed and alleviated by a suspension structure including an arm, a spring, and a damper.

On the contrary, in the case of an aircraft moving in the sky of a three-dimensional space such as air, an external shock and disturbance are applied to all of the six axes of translation and rotation. If the aircraft adopts, for example, a suspension structure as shown in FIGS. 7A and 7B including a spring and a damper for absorbing and alleviating a shock transmitted from the main wing to which an external disturbance is applied, a problem arises in that even a posture control operation using the tail wing is absorbed and alleviated. As will be understood from this problem, it is extremely difficult to introduce a general suspension structure to the known aircraft.

However, in a flight machinery having the configuration shown in FIGS. 5A and 5B, when, for example, a telescopic shafts 3 shown in FIGS. 8A, 8B, and 8C are additionally provided, it is possible to configure a suspension structure that absorbs and alleviates disturbance from all six axes by three axes of translation and three axes of rotation. FIGS. 8A, 8B, and 8C illustrate a resultant motion when disturbance 4 occurs on the flight machinery. It is divided into a roll motion and a translation motion, and is absorbed and alleviated by the power joint and the telescopic shaft.

FIG. 9 shows an embodiment of the invention in which the wing is connected to the main body at one point by the power joint. It is a schematic view of an actual prototypic flight machinery. Reference Numeral 1 denotes a foldable lightweight wing for generating a lift force of the flight machinery as described above. Reference Numeral 2 denotes a power joint according to the invention for controlling the foldable lightweight wing so that the flight machinery keeps its posture. Reference Numeral 5 denotes an aileron for aerodynamically controlling a roll posture. Reference Numeral 3 denotes a swing rod serving as a telescopic shaft that connects the foldable lightweight wing to the main body. Reference Numeral 6 denotes an actuator and a force sensor for controlling a telescopic operation of the telescopic shaft. Reference Numeral 7 denotes an injection type engine. In a demonstration experiment, a turbojet engine is used as the engine, but the system is also feasible by using an electric fan or a compressed air turbine. Reference Numeral 8 denotes a vehicle wheel for taking off and landing.

FIG. 10 is an explanatory view illustrating an internal configuration of the actual prototypic flight machinery according to an embodiment of the invention. The power joint 2 according to the invention that controls the foldable lightweight wing for posture maintenance or steering of the airplane is constituted by an electric servo motor mounted with a rotary encoder capable of detecting a precise angle, and the electric servo motor is mounted at the positions 9 and 10. A sensor unit 11 mounted with a three-axis acceleration sensor and an angular velocity sensor (gyro sensor) for detecting a roll angle and a pitch angle of the foldable lightweight wing 1 is provided at the connection point between the foldable lightweight wing 1 and the telescopic shaft 3. FIG. 10 shows a microcomputer unit 12 that controls a posture of the wing and the main body by an electric control based on the information output from the sensor unit 11. The microcomputer unit 12 includes a circuit for performing a signal process related to a posture control of the flight machinery based on information from various sensors, a program storage microprocessor, an output driver circuit, a remote instruction receiver, and a receiving signal processing circuit. Reference Numeral 13 denotes a battery of 48 V for operating a two-axis control motor of 120 W in the embodiment. Reference Numeral 14 denotes a turbojet engine fuel tank, in which two independent tanks for two engines denoted by Reference Numeral 7 are provided. Reference Numeral 15 denotes a position control RTK-GPS receiver for performing an autonomous control operation and a microprocessor for processing a man-machine interface based on a remote communication.

FIGS. 11A, 11B, and 11C illustrate a folding mechanism of the foldable lightweight wing 1 shown in FIGS. 9 and 10. The foldable lightweight wing includes a frame 16 formed of a carbon fiber composite (CFRP) and an epidermis material 17 formed of a high-tension synthetic fiber. Since the wing is foldable, it has advantages that storage, transportation, and maintenance thereof are easy and low-cost on land. Additionally, since the foldable lightweight wing is connected to the main body by the power joint, the main body and the wing are separated, and no fluid turbulence is caused by a boundary layer between the wing and the main body. Also, a maximum lift force is generated in the vicinity of the center of the wing where the center of gravity is located.

In the known aircraft in which a part including a wing is called a fuselage, when a wing having a heavy weight and a large size is adopted, the center of gravity is located in the vicinity of the wing. However, by adopting a wing as shown in FIG. 11, a wing load can be reduced, and thus a stall velocity is remarkably reduced. Further, it is advantageous that it is not necessary to change the posture of the main body so as to change the attack angle of the wing. Furthermore, since the main body is not located at the center of the wing, a stall at the center for generating a maximum lift force is performed at the lowest velocity.

A roll control of the wing controls flight stabilization by a position control of the center of gravity without using a hydrodynamic operation. As shown in FIG. 10, a roll control servo motor 9 serving as a drive source of the two-axis joint 2 for controlling the posture of the flight machinery is attached to the base of the swing rod that connects the wing to the main body at the wing's end, and the power is transmitted to the swing rod through a one-stage reduction gear. As a sensor, there are provided a rotary encoder and a rate gyro attached to a motor shaft.

FIG. 12 is a modeled explanatory view illustrating a mechanism in which the main body controls the posture of the foldable lightweight wing through the power joint with respect to the roll axis. Basically, it is considered that, in a motion equation of a pendulum, a supporting point of the pendulum is moved by an object having a high air resistance. FIG. 12 illustrates a situation where the posture of the aircraft is tilted at $\theta_1$ with respect to a horizontal plane due to the external disturbance $T_z$ and then a servo motor operates in order to correct the posture.

In the roll posture control model, when a counterclockwise roll direction of the aircraft is defined as a positive direction, a motion equation can be expressed as [Formula 1] and [Formula 2] using Reference Numerals shown in FIG. 12 and Table 1. Table 1 shows actual values of each physical quantity of the Formulas in the embodiment.

$$[M_1 l_1^2 + (1/12)M_2(l_2^2 + a^2)]\ddot{\theta}_1 + (1/4)C_D S\rho \dot{\theta}_1^2 \cos\theta_1 - M_1 g \sin\theta_1 = T_z \quad \text{[Formula 1]}$$

$$M_1 l_1^2 \ddot{\theta}_2 + (1/12)M_2(l_2^2 + a^2)\ddot{\theta}_1 + (1/4)C_D S\rho \dot{\theta}_1^2 \cos\theta_1 - M_1 g \sin(\theta_1 + \theta_2) = nK_t I \quad \text{[Formula 2]}$$

| | | |
|---|---|---|
| Mass of the body | $M_1$ [kg] | 138 |
| Mass of the airfoil | $M_2$ [kg] | 25 |
| Moment of inertia of the body | $J_1$ [kgm$^2$] | 207 |
| Moment of inertia of the airfoil | $J_2$ [kgm$^2$] | 625 |
| Length of between body and airfoil | $l_1$ [m] | 15 |
| Half length of airfoil span | $l_2$ [m] | 5 |
| Torque constant of the motor | $K_\tau$ [Nm/A] | 10.3 |
| Reduction ratio of the gear | n | 50 |
| Density of standard atmosphere | $\rho$ [kg/m$^3$] | 1.225 |
| Drag coefficient | $C_D$ [m/s$^2$] | 0.5 |
| Area of the airfoil | S [m$^2$] | 17 |

On the fuselage during the posture control, the wing is substantially horizontal, and the swing rod is vertically upright. An actual tilt of the fuselage can be approximated to $\theta_1$ based on a comparison of inertia moments $J_1$ and $J_2$ between the wing and the main body shown in Table 1. The actual external disturbance $T_z$ is relatively small with respect to the system such that the average wind velocity is normally in the range of 2 to 5 m/s. At this time, since $\theta_1$ has a value only near 0, a linearization is possible by setting $\theta_1 = 0$, $\sin\theta_1 = \theta_1$, and $\cos\theta_1 = 1$. Therefore, a system representation in a linear control theory can be expressed as [Formula 3].

$$dx/dt = Ax + bI \quad \text{[Formula 3]}$$

Where, $$x = \begin{bmatrix} \theta_1 \\ \theta_2 \\ \dot{\theta}_1 \\ \dot{\theta}_2 \end{bmatrix}, A = \begin{bmatrix} 0 & 0 & 1 & 0 \\ 0 & 0 & 0 & 1 \\ a_1 & 0 & 0 & 0 \\ a_2 & a_3 & 0 & 0 \end{bmatrix}, b = \begin{bmatrix} 0 \\ 0 \\ b_1 \\ b_2 \end{bmatrix}$$

Components a1, a2, a3, b1, and b2 are obtained as follows.

The motion equation [Formulas 1 and 2] can be expressed as the following [Formula 4].

$$A_0 \begin{bmatrix} \ddot{\theta}_1 \\ \ddot{\theta}_2 \end{bmatrix} + B_0 \begin{bmatrix} \theta_1 \\ \theta_2 \end{bmatrix} + C_0 \begin{bmatrix} \dot{\theta}_1^2 \\ \dot{\theta}_2^2 \end{bmatrix} = D_0 I \quad \text{[Formula 4]}$$

Where, $$A_0 = \begin{bmatrix} M_1 l_1^2 + (1/12)M_2(l_2^2 + a^2) & 0 \\ (1/12)M_2(l_2^2 + a^2) & M_1 l_1 \end{bmatrix}$$

$$B_0 = \begin{bmatrix} M_1 g & 0 \\ M_1 g & M_1 g \end{bmatrix}$$

$$C_0 = \begin{bmatrix} (1/4)C_D S\rho & 0 \\ (1/4)C_D S\rho & 0 \end{bmatrix}$$

$$D_0 = \begin{bmatrix} -nK_t \\ nK_t \end{bmatrix}$$

Since an aerodynamic drag force of the wing is non-linear, a linear control is performed based on the approximation of $\theta_1 = \theta_2 = 0$. Then, [Formula 4] can be modified to the following [Formula 5].

$$\begin{bmatrix} \ddot{\theta}_1 \\ \ddot{\theta}_2 \end{bmatrix} = -A_0^{-1} B_0 \begin{bmatrix} \theta_1 \\ \theta_2 \end{bmatrix} + -A_0^{-1} D_0 I \quad \text{[Formula 5]}$$

The components A and B in [Formula 3] can be obtained as below when the component $A_0$ is denoted as follows and a determinant is denoted by $\Delta$.

$$A_0 = \begin{bmatrix} a_{11} & 0 \\ a_{21} & a_{22} \end{bmatrix}$$

$$a_1 = -(1/\Delta)M_1 g[M_1 l_1^2 + (1/12)M_2(l_2^2 + a^2)]$$

$$a_2 = -(1/\Delta)M_1 g[(1/12)M_2(l_2^2 + a^2) - \{M_1 l_1^2 + (1/12)M_2(l_2^2 + a^2)\}]$$

$$a_3 = -(1/\Delta)M_1^2 l_1 g$$

By using the linearization approximation described above, the system can be controlled and all the four state variables can be sensed. Accordingly, it is possible to stabilize the system by a state feedback.

After actually manufacturing the prototypic flight machinery, the inventor has found out that when the servo motor of the power joint is designed to be operated by the position control of the encoder, it automatically holds the wing horizontal by the weight of the main body and functions as a spring & damper in the rotation axis direction. This is a feature of the invention that is realized by two facts that the weight of the wing is small in comparison to the main body and that the power joint controls the position thereof.

In contrast to the designs of the known aircrafts, in the design of the aircraft according to the invention, it is possible to separately design the wings and the main body. If the output of the thrust engine of the main body is set to be uniform, a characteristic of the flight machinery is determined depending on the performance of the wings. In the embodiment, as shown in FIGS. 9 and 10, a total thrust force of the two turbojet engines of an aircraft is 400 N at static thrust. In the embodiment described below, a thrust value that is obtained by subtracting a safe margin from the output is adopted for the calculation. A required thrust force curve is calculated based on velocity dependence of the thrust force and velocity dependence of a lift/drag ratio of the foldable lightweight wing.

Results of the calculation when the following three foldable lightweight wings are used are:

F195 TYPE (operation velocity range 24~60 Km/h)
US147 TYPE (operation velocity range 28~80 Km/h)
EXT160 TYPE (operation velocity range 30~110 Km/h)

Each required thrust force curve of the foldable lightweight wings is shown in FIG. 13. The required thrust force curve is obtained as follows.

When a lift force, a drag force, a thrust force necessary for a horizontal flight and a gravity force are denoted by L, D, T, and W, respectively, a relationship is obtained as follows:

$$D = C_D(1/2)\rho V^2 S = T_r \quad \text{[Formula 6]}$$

$$L = C_L(1/2)\rho V^2 S = W \quad \text{[Formula 7]}$$

Here, $\rho$ denotes atmospheric density, V denotes an airspeed, S denotes a wing size, $C_D$ denotes a drag force coefficient, $C_L$ denotes a lift force coefficient. A relationship of $T_r = W (C_L/C_D)$ is obtained based on [Formulas 6 and 7], and a characteristic of a flight machinery shown in FIG. 13 can be obtained based on a ratio curve between the actually measured lift and drag forces.

The reason why a characteristic can be easily calculated even when a different wing is mounted to a main body is because the wing and the main body are connected to each other via a controllable power joint. Under present circumstances, since the optimized wings are less in number, there has been used a method of selecting a wing suitable for the main body from the limited types of wings and connecting them to each other. Also in the embodiment, the main body is designed by selecting one of the above-mentioned three types of wings.

INDUSTRIAL APPLICABILITY

As described in Japanese Patent Application No. 2005-109330 that has been previously suggested by the inventor, an aerial lifting operation could have been carried out only by the bladed aircraft (helicopter). By thereby using the flight machinery according to the invention, it is possible to construct a reliable aerial transportation system at a low cost. Also, it is compact in size and does not occupy a space in land. Additionally, it is possible to use the flight machinery not only in the aerial lifting operation and transportation of materials of architecture or construction, but also in necessary usages in various industries such as a transportation, a conveyance, a delivery, and a traffic.

What is claimed is:

1. A flight machinery omitting a horizontal tail wing comprising;
   a lightweight wing having 50% or less weight than that of a main body,
   a fuselage as the main body,
   a telescopic shaft connecting the lightweight wing to the fuselage and enabling a distance between the lightweight wing and the fuselage to be adjusted on a line joining a center of gravity of the lightweight wing and a center of a lift force, and
   a power joint attached to the wing-side end of the telescopic shaft and controlling a posture of the lightweight wing.

2. The flight machinery driven three-degree-of-freedom joint.

3. The flight machinery according to claim 1, wherein the lightweight wing is detachable at a connection portion to the fuselage and is applied by being connected to another fuselage than the detached fuselage.

4. The flight machinery according to claim 3, wherein the connection portion has a common standard structure so that a plurality of the lightweight wings and a plurality of the fuselages can be arbitrarily selected to be connected to each other.

5. The flight machinery according to claim 1, wherein the lightweight wing has a foldable structure.

6. The flight machinery according to claim 1, wherein the lightweight wing holds no fuel tank.

7. The flight machinery according to claim 1, wherein the flight machinery is used in a physical distribution system or transportation facilities.

\* \* \* \* \*